United States Patent [19]

Thomas

[11] Patent Number: 4,552,246
[45] Date of Patent: Nov. 12, 1985

[54] PORTABLE HUNTER TREE STAND
[75] Inventor: A. Lynn Thomas, Texarkana, Ark.
[73] Assignee: Thomas Tree Stand Co., Inc., Texarkana, Ark.
[21] Appl. No.: 661,569
[22] Filed: Oct. 16, 1984
[51] Int. Cl.$^4$ ............................................. A01M 31/02
[52] U.S. Cl. ..................................... 182/116; 182/187
[58] Field of Search .................. 182/187, 116, 214, 93

[56]  References Cited
U.S. PATENT DOCUMENTS

| 3,057,431 | 10/1962 | George | 182/116 |
| 3,318,415 | 5/1967 | Christie | 182/116 |
| 3,336,999 | 8/1967 | McSwain | 182/151 |
| 3,961,686 | 6/1976 | Starkey | 182/187 |
| 4,061,202 | 12/1977 | Campbell | 182/116 |
| 4,124,094 | 11/1978 | Cande | 182/187 |
| 4,134,474 | 1/1979 | Stavenau | 182/116 |
| 4,246,981 | 1/1981 | Stavenau | 182/116 |
| 4,257,490 | 3/1981 | Bandy | 182/189 |
| 4,316,526 | 2/1982 | Amacker | 182/187 |
| 4,331,216 | 5/1982 | Amacker | 182/187 |
| 4,417,645 | 11/1983 | Untz | 182/187 |

Primary Examiner—Reinaldo P. Machado
Attorney, Agent, or Firm—Stephen D. Carver

[57] ABSTRACT

A portable tree stand foldable between transportable and operational positions primarily for use by hunters. The tree stand comprises a rigid, spike-equipped, seat for supporting the hunter above ground adjacent to and in contact with a selected tree, and a cooperating, rigid foot rest adapted to be operationally disposed in spaced-apart, generally parallel relation beneath the seat. The foot rest is pivotally mounted to a rigid, generally U-shaped yoke having upper ends pivotally secured to opposite sides of the seat frame. A pair of spike-equipped jaw members which are pivotally coupled to the seat frame extend rearwardly therefrom and are normally biased apart to a fully open, tree-engaging position. The jaw members include integral, outwardly diverging locking arm portions which are adapted to be drawn together by the hunter with a rope during stand installation to forcibly compress the jaw members in binding, substantially circumferential engagement with the selected tree. A rigid, downwardly extending V-shaped brace pivotally associated with the seat terminates in a lower spike for penetrating the tree. A stabilizer operationally, generally horizontally extending between the V-brace and the yoke reinforces the stand and assures penetration of the tree by the V-brace spike. A preferably multi-segment ladder extends between the bottom of the yoke and ground and functions as a support stanchion, and the ladder may be manually grasped by the hunter to manipulate the tree stand facilitating ease of installation. Preferably an elongated rope having one end permanently attached to one of the jaw member locking arm portions facilitates rapid jaw member compression and thus convenient tree stand erection.

16 Claims, 7 Drawing Figures

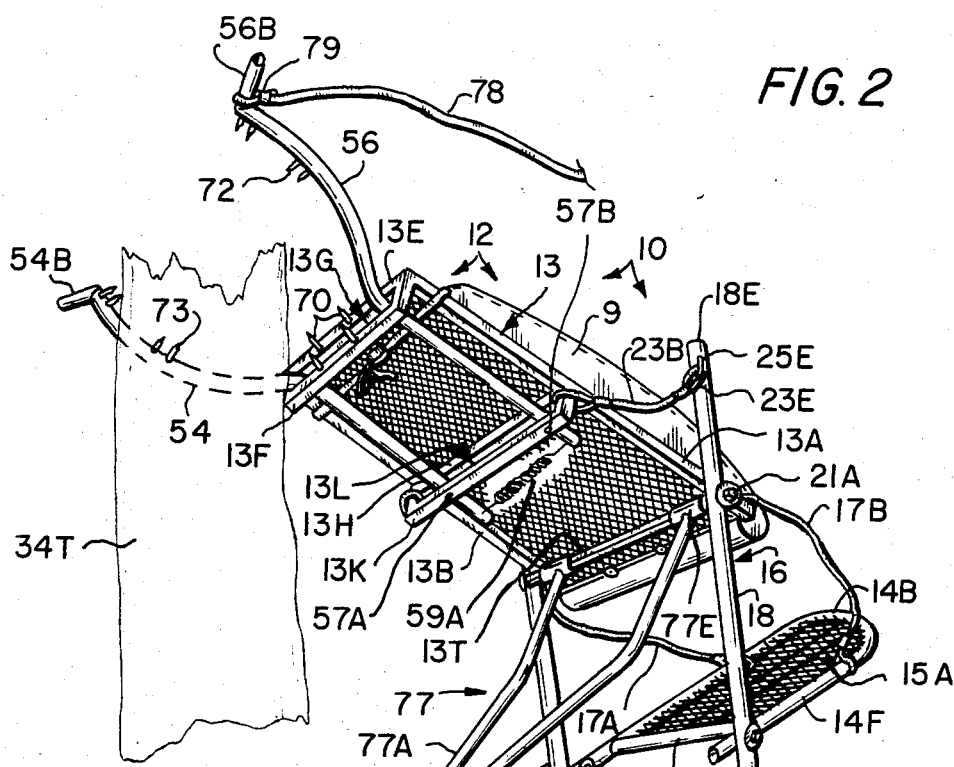
FIG. 2
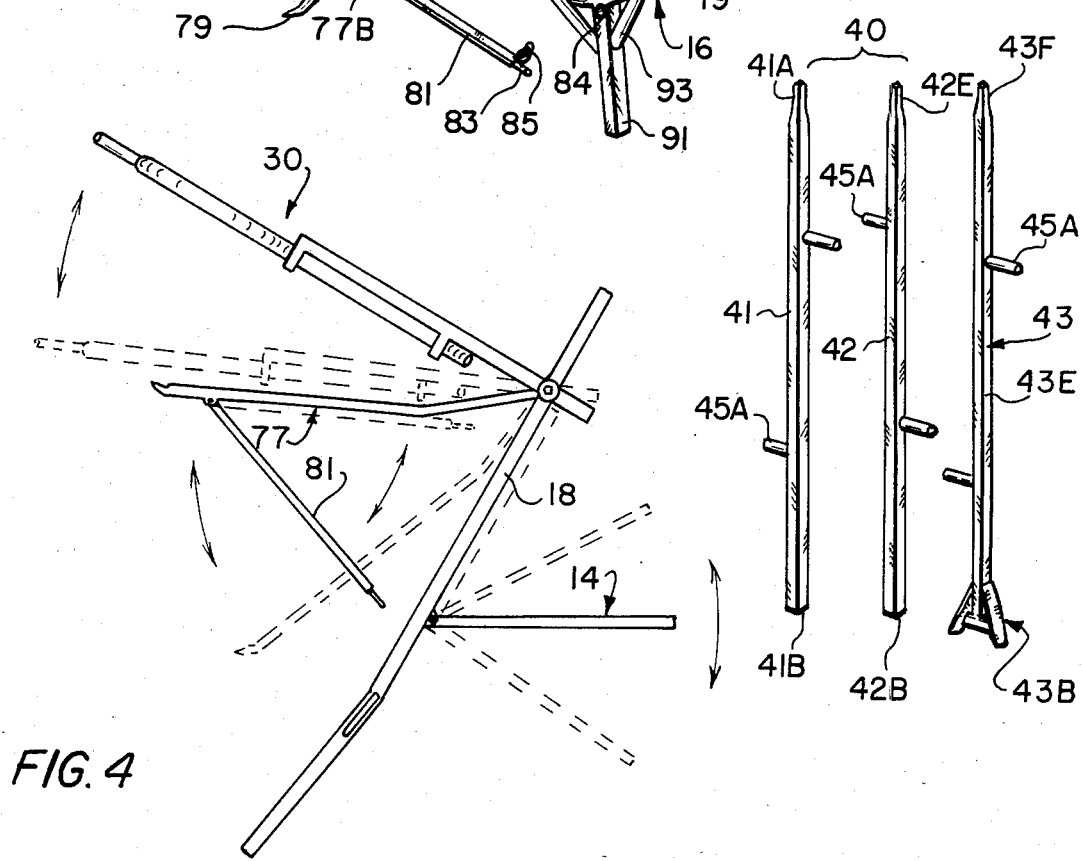
FIG. 3
FIG. 4

PORTABLE HUNTER TREE STAND

BACKGROUND OF THE INVENTION

The present invention relates generally to hunter tree stands adapted to be attached to a selected tree with which a hunter may elevate and support himself for subsequent hunting. More particularly, the present invention is directed to a portable and foldable tree stand which may be quickly and quietly installed upon a desired tree and which securely and safely holds the hunter in a comfortable and safe position readily facilitating the observation of and subsequent taking of game animals.

As will be readily be appreciated by skilled hunters, tree stands provide a number of practical advantages. Skilled hunters recognize the desirability of assuming a relatively camouflaged position as the approach of a game animal is awaited. Since the hunter must often wait for relatively long periods of time until a suitable game animal approaches, he must deploy himself in a comfortable position where his relative safety is assured and his subsequent ease in shooting is guaranteed. Where, for example, deer are sought in relatively dense woods, as is usually the case when hunting in Southern States such as Arkansas, Louisianna, Mississippi and the like, it is extremely advantageous for a serious hunter to elevate himself above ground so that he or she may have relatively unobstructed command of a sufficient area of woods.

For a variety of reasons the use of large, platform-type blinds is often inconvenient for many hunters. Tall platform stands or blinds usually must be permanently left at a particular hunting area. Due to the expenses and inconvenience associated with elevated blinds or hunting platforms, it is usually desirable for the hunter to either own or lease the land upon which such a blind may be built. Where this is impractical, tree stands are suggested, since an appropriately-designed tree stand guarantees the hunter command of a relatively wide area from which game may be safely taken. It is imperative that a suitable tree stand be safe, comfortable, easily deployed, and substantially concealable.

Accordingly the prior art suggests a wide variety of tree stand inventions. The prior art tree stands known to me include some form of seat and cooperating foot rest, and a variety of different structural elements for securing the stand upon a desired tree. Untz, in U.S. Pat. No. 4,417,645, and Amacker, in U.S. Pat. No. 4,331,216, depict tree stand devices of this general description. Cotton, in U.S. Pat. No. 3,196,240, illustrates a climbing device in which a pair of operationally linked projecting platforms theoretically enable the hunter to climb the tree. Amacker, in U.S. Pat. Nos. 4,316,526 and 4,331,216 and Staveneau, in U.S. Pat. No. 4,134,474, depict similar "climbing" tree stand devices. Basic tree stand inventions are also illustrated in U.S. Pat. Nos. 4,124,094 and 3,961,686 and U.S. Pat. No. Des. 270,474.

The most relevant prior art known to me comprises tree stands of the type adapted to be folded between transportable and deployed positions. Usually art of this nature includes some form of seat and cooperating foot-rest for use by the hunter. Inventions typified broadly by the aforementioned characteristics include Campbell, in U.S. Pat. No. 4,061,202, Southard, in U.S. Pat. No. 3,871,482, Van Gompel, in U.S. Pat. No. 4,022,292, and Gray in U.S. Pat. Nos. 3,817,350 and 3,241,734. U.S. Pat. No. 4,225,013, issued to Sample on Sept. 30, 1980, depicts a tree stand of the aforementioned characteristics, in which a J-shaped hook device associated with the tree stand frame facilitates binding attachment to a selected tree.

However, most prior art tree stands known to me are rather inefficient and difficult to operate with when hunting in the Southern pine forests. In the "best case" analysis, a tree stand must be lightweight and transportable, and it must be capable of simple, quick deployment. Where trees have numerous branches, many "self-climbing" tree stands ae totally impracticable. Moreover, the characteristic shape of most pine trees also limits the ability of the hunter to maneuver a tree stand into correct position for subsequent installation. I have found that it is extremely beneficial if a tree stand can be installed by relatively simple movements directly toward or away from the tree trunk without necessitating sideways or lateral maneuvering.

Additionally, a preferred tree stand must be quietly deployable, and once erected it must rigidly maintain itself in a constant position to adequately support the hunter. Since initial installation will likely occur in the early morning hours in almost total darkness, ease of installation is a critical factor. Also, it is mandatory that a tree stand be capable of one-man erection without the use of hand tools or the like. It is also important that hunter ingress and egress be facilitated quietly and efficiently, and since the tree stand is often temporarily left in a tree when the hunter returns to camp, means for temporarily insuring its security are advantageous.

SUMMARY OF THE INVENTION

The present invention comprises a collapsible tree stand which may be easily transported by the hunter into the woods for subsequent erection and attachment to a selected tree.

Preferably the apparatus of the present invention includes a generally planar, rigid seat which is operatively associated with a rigid, spaced apart planar foot rest. The seat and foot rest are foldably interrelated and structurally coupled together by a rigid, generally U-Shaped yoke which is pivotally associated with both. A pair of cooperating, spike-equipped jaws, which occupy a plane substantially parallel with the seat, project rearwardly from the seat for circumferentially engaging a tree. Preferably a rigid, generally V-shaped brace pivotally downwardly extends from the front portion of the seat and converges in a rigid, terminal spike portion which is adapted to penetrate and firmly engage a desired tree. In the best mode known to me, a rigid, elongated stabilizer extends from the brace into engagement with the yoke for encouraging penetration of the tree by the V-brace spike. The effective length of the stabilizer is preferably adjustable to facilitate secure mounting of the stand, and it provides additional stability and operational strength to the installed tree stand.

Both of the jaw members preferably include terminal, outwardly diverging locking arm portions which may be drawn together with a rope or the like for forcibly compressing the jaw members in binding, substantially circumferential engagement with the selected tree. Normally the jaw members are biased apart to a "maximum open" position by a suitable spring, so that the stand may be quickly pushed against a suitable tree, the diameter of which is not critical. When the jaw members are thereafter compressed towards one another, preferably by an associated rope which is tightly drawn around the jaw member locking arm portions, at least a portion of the spikes associated with each jaw member are driven into the tree to facilitate firm, binding engagement. Firm operational engagement is also encouraged by a plurality of spikes extending rearwardly from the seat into penetrating engagement with the tree trunk. In the best mode an elongated rope has one end permanently affixed to one of the jaw member locking arms, and during installation this rope is wound twice around the locking arms, diagonally down a side of the tree to subsequent engagement with the ladder, and then is routed back to the tree and firmly tied thereto.

Preferably, an elongated, rigid vertical ladder assembly, comprised of a plurality of individual, axially aligned cooperative elements, is adapted to be deployed between the tree stand and the ground. Besides readily facilitating hunter ingress and egress, the ladder assembly functions as a vertical support stanchion, and it enables the hunter to conveniently manipulate the tree stand for initially installing it upon a tree in an appropriate elevated position. Manipulation of the jaw members and the stand during erection may be easily and quickly facilitated by manual grasping of the ladder means. Unlike prior art devices, the hunter need not assume a position in the tree prior to engagement of the tree stand, and it is unnecessary to attempt to engage the tree trunk by lateral movement. In other words, the present invention provides a means whereby the tree stand may be simply pressed towards the tree for subsequent firm engagement with the tree.

The tree stand is folded to a substantially flat position for convenient carrying. After the hunter selects appropriate an appropriate tree for hunting, the tree stand is simply unfolded, and the ladder means may be attached to allow the stand to be subsequently vertically maneuvered. At this time the jaws will be "open" and the spikes projecting rearwardly from the seat may be thrust into engagement with the tree trunk. An associated rope is then tightly drawn around the jaw locking arm portions forcing the jaws together, and one or more of the associated jaw spikes will firmly penetrate the tree assuring that the jaws ramain in tight, surrounding contact with a major portion of the tree. Afterwards, the V-brace is maneuvered into engagement with the tree, and the V-brace stabilizer is coupled to the yoke, insuring that the V-brace spike portion firmly engages the tree. A pair of cables associated with the seat are then manually coupled to the yoke to encourage proper orientation of the seat, and a similar pair of flexible support cables extending between the seat and the front of the foot rest will become tensioned when the foot rest is unfolded to the deployed position to further brace and stabilize the entire assembly. Preferably, the effective operational length of the stabilizer is field adjustable by the hunter so that the tree stand may be tightly tensioned assuring that the V-brace spike firmly penetrates the tree.

Once the lowermost portion of the ladder assembly is subsequently urged into the ground, the hunter may thereafter climb the ladder and assume a comfortable and safe position upon the seat with his feet firmly braced upon the lower foot rest. If the hunter wishes to temporarily abandon the tree stand, he may simply climb down the ladder and then manually pull it to disengage it from the yoke. He may then return with it to his camp, leaving the "deployed" tree stand firmly attached at an inaccessible position within the chosen tree. Since the tree stand is camouflaged, the hunter need not worry that it will be easily discovered by another and stolen. Even if the temporarily abandoned stand is discovered by another, its vertically elevated position will present a certain impediment to a would-be thief.

When the hunt is over, the rope is untied and subsequently pulled to "pop" one of the jaw elements from engagement with the tree. The thus loosened jaw assembly facilitates subsequent rocking of the stand (i.e. via the ladder assembly), and thereafter the stand may be removed from the tree. Once on the ground, the stand stabilizer is disassociated from the yoke, and the seat cables are disconnected. The entire apparatus is then folded together, and the rope may be appropriately wound secured about the apparatus and tied to provide a convenient "handle" for subsequent carrying.

Thus, a broad object of the present invention is to provide a dependable, rigid, reliable tree stand of readily portable characteristics.

A more basic object of the present invention is to provide an easily transportable tree stand which may be quickly unfolded into an easily deployable position.

Another basic object of the present invention is provide a tree stand of the character described which may be easily assembled and quickly deployed in hunting conditions (i.e., darkness) quickly, easily and quietly, with a minimum expenditure of physical effort.

A similar object is to provide a tree stand which may be easily transported by the hunter while allowing him full control and use of his weapon.

Yet another fundamental object of the present invention is to provide a dependable tree stand of the character described which guarantees relative security and safety to the hunter.

Yet another object of the present invention is to provide a tree stand of the character described which is readily adaptable for use with trees of varied species and different diameters.

Another fundamental object of the present invention is to provide a reliable and safe tree stand of the character described which avoids reliance upon chains, belts and the like for support.

Another object is to provide a tree stand of the character described which may be readily carried, easily deployed, and readily dissassembled by a single individual possessing average strength and physical endurance.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 2 is a fragmentary isometric view of a tree stand constructed in accordance with the best mode of the present invention, taken from a vantage point generally beneath the stand, the stand illustrated in an operational orientation which it assumes immediately prior to deployment upon a suitable tree, with portions thereof broken away or shown in section for clarity, or omitted for brevity;

FIG. 3 is an isometric view illustrating individual segments of the preferred ladder assembly;

FIG. 4 is a diagrammatic view of the tree stand illustrating moved positions of major parts in dashed lines;

DETAILED DESCRIPTION

Figure 1:
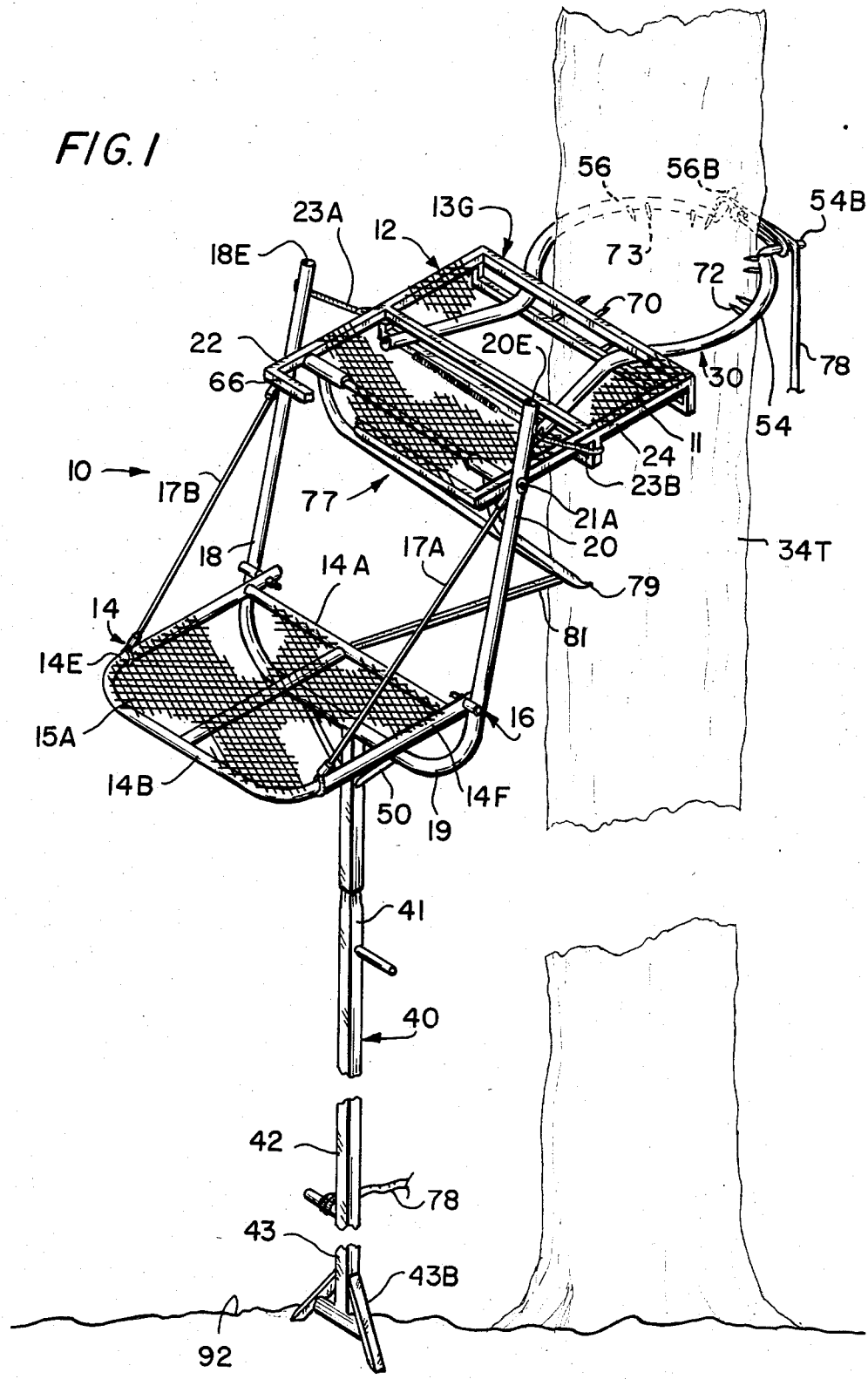
FIG. 1 is a fragmentary isometric view of a tree stand constructed in accordance with the best mode of the present invention, illustrated in an operational position deployed upon a suitable tree, and with portions thereof broken away or shown in section for clarity, or omitted for brevity.

With initial reference now directed to FIGS. 1 and 2 of the drawings, a portable hunter tree stand constructed in accordance with the preferred teachings of the present invention has been generally designated by the reference numeral 10. Tree stand 10 is adapted to be readily transported in a "folded" orientation (FIGS. 4, 7) and when a hunter reaches a desired spot in the woods for subsequent hunting, stand 10 may be "unfolded" and deployed upon a suitable tree, as will hereinafter be described. Prior to deployment, the hunter should select a suitable tree which, when he thereafter assumes a relatively elevated position, will provide him with effective command of a relatively large surrounding area.

Stand 10 includes a rigid, generally planar seat 12 upon which the hunter or outdoorsman may sit, and a flat and rigid, cooperating foot rest 14, both of which are operatively associated with a rigid, generally U-shaped yoke 16. As best viewed in FIG. 2, seat 12 is of generally rectangular dimensions, and it includes a rigid frame generally designated by the reference numeral 13, which includes a pair of parallel, spaced-apart sides 13A and 13B and a front cross piece 13C. Frame 13 terminates at its rear end in a rigid, box-like portion consisting of parallel, spaced-apart frame elements 13E and 13F which define a rectangular slot 13G therebetween. Frame 13 is further braced by an intermediate portion consisting of twin, transversely disposed, parallel and spaced-apart members 13H and 13K, between which a rectangular slot 13L (FIG. 2) is defined. Frame members 13E, 13H and 13T are parallel with one another and each extends perpendicularly between and is rigidly secured to frame sides 13A and 13B. A seat surface is provided by a suitably sized sheet of metallic grating, generally designated by the reference numeral 11, and an optional cushion 9 which may be pivotally coupled to the front frame element 13C.

Figure 7:
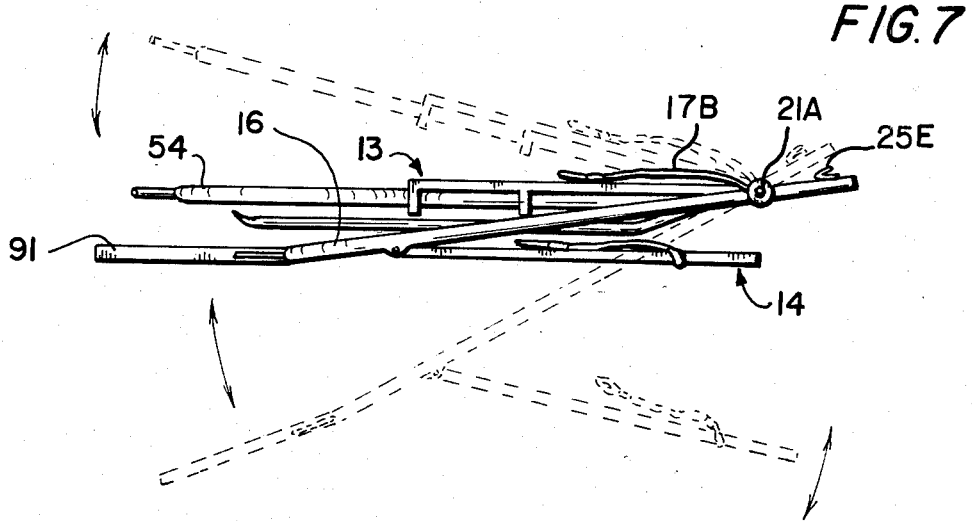

Yoke 16 includes a pair of sides 18 and 20 which are integral with and extend perpendicularly upwardly from a lower, somewhat arcuate transverse portion 19. The seat 12 is pivotally secured between yoke sides 18 and 20 by typical bolts 21A and 21B which threadably extend into opposite ends of the seat frame members 13T. The lower foot rest 14 includes a rigid frame comprised of a front member 14B, a pair of rigid, spaced apart sides 14E and 14F, and a transverse rear member 14A. A suitably sized metallic, sheet-like grating 15A is secured over the foot rest frame. Suitable bolts such as bolt 23A (FIG. 2) are employed to pivotally secure the foot rest relative to the yoke 16. Preferably a pair of cooperating, flexible cables 17A and 17B extend between front portions of the seat frame 13 (i.e. they are permanently attached by bolts 21A) and the sides 14E and 14F of the foot rest 14. A similar pair of cables 23A and 23B extend from the intermediate portion of the seat frame 13, and preferably terminate in hoop ends 23E adapted to be coupled during erection of the tree stand 10 to suitable hooks 25E affixed to the top portions 18E and 20E of the yoke sides. With reference to FIGS. 4 and 7, the stand may be folded between operative and transportable positions.

Figure 5:
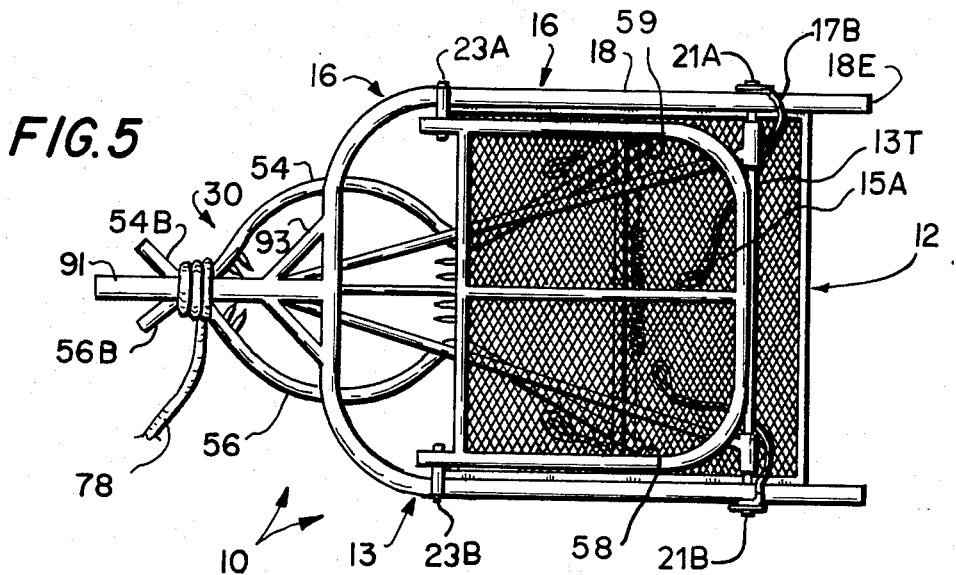
FIG. 5 is a fragmentary plan view of the tree stand, with the stand folded together in a transportable position.

A jaw system, generally designated by the reference numeral 30, extends outwardly from the rear of seat frame portion 13G towards a suitable tree 34T which it is adapted to substantially circumferentially engage. Jaw means 30 comprises a pair of generally arcuate, rigid, jaw members 54 and 56 which occupy a plane substantially parallel with and spaced apart from the plane of the seat grating 11. The jaw members are pivotally associated with the seat frame 13, and they extend through the frame slots 13G and 13L previously discussed. As best viewed in FIGS. 2 and 5, the inner ends 58 and 59 of the jaw members are pivotally secured at points 57A and 57B for limited pivotal displacement between seat frame members 13H and 13K. The jaw members terminate in outwardly diverging locking arm portions 54B and 56B. A spring 59A extends between jaw member ends 58 and 59 to urge these ends together, thus maintaining the jaw elements in as wide an "open" position as possible. In other words the spring 59A normally maintains the jaw locking arm portions 54B and 56B as far apart as possible, to provide maximum initial clearance so that the jaw system 30 may subsequently be quickly installed in generally circumferential relationship about a tree.

A plurality of rigid teeth or spikes 72, 73 which project from inner sides of the jaw members are adapted to forcibly penetrate the tree upon which the stand is to be installed. These spikes are similar to rigid spikes 70 which rigidly emanate from seat rear frame portions 13E and 13F and which are adapted to be forcibly thrust into engagement with the tree when the stand is installed, as hereinafter will be described in detail. An elongated rope, generally designated by the reference numeral 78, is preferably permanently affixed to one of the jaw members. As best viewed in FIG. 2, rope 78 is preferably attached to jaw member 56 at the junction locking arm member 56B. During installation this rope will be tightly wound around locking arm members 54B and 56B to forcibly compress the jaw members together, with the tree captured therebetween.

The tree stand also comprises a cooperating, downwardly and inwardly extending generally V-shaped brace, generally designated by the reference numeral 77. Brace 77 includes a pair of rigid, converging sides 77A, 77B which, generally at the point of convergence, are provided with a spike 79 which is adapted to firmly penetrate the tree trunk. The spaced apart upper ends of the V-brace sides 77A, 77B are pivotally associated with the seat frame. Each preferably terminates in a suitable mandrel 77E pivotally captured by seat frame member 13T previously discussed. In the best mode of the invention a rigid, elongated stabilizer 81 is pivotally secured to the V-brace 77 near the bottom thereof, and when the stand is deployed the stabilizer may be generally horizontally extended into operational, bracing contact with a portion of the yoke 16. The stabilizer 81 includes means for effectively varying its operational length, which means include a twistable, elongated threaded member 83 which is threadably received within a suitable orifice associated with the end of the stabilizer, and which is adapted to be received within a yoke orifice 84 (FIG. 2). Member 83 is provided with a wing 85 to facilitate manual twisting or adjustment whereby to expand or contract the deployed length of the stabilizer 81 so that the cooperative parts of the stand may be suitably tensioned during erection, as will hereinafter be described.

Hunter ingress and egress is facilitated by ladder means, generally designated by the reference numeral 40 (FIGS. 1,3), which, when properly assembled, extends between the ground 92 and the yoke 16. Preferably the ladder means 40 comprises, and is adapted to be field assembled from, a plurality of separate ladder elements 41, 42, and 43 which are adapted to be axially coupled together. The lowest ladder portion 43 comprises a lower, web-like base 43B adapted to contact ground 92 and an intermediate stanchion portion 43E which extends from the base 43B to a crimped or reduced dimension segment 43F, which, for example, is adapted to be selectively, axially fitted within the hollow bottom portion 42B of the ladder member 42. Similarly, the crimped end 42E of member 42 may be fitted to the hollow bottom 41B of ladder member 41. Finally, crimped ladder element top 41A may be fitted to the hollow member 91 (FIG. 2) associated with the yoke 16. Member 91 is rigidly affixed as by welding or the like approximately to the center of yoke portion 19, and it is braced by struts 93. Orifice 84, previously described, is preferably defined in the uppermost portion of member 91. Each of individual the ladder means assembly elements 41,42 and 43 are provided with a plurality of regularly spaced-apart, laterally projecting steps 45A upon which the user may step to facilitate ingress and egress to the assembled stand.

Figure 6:
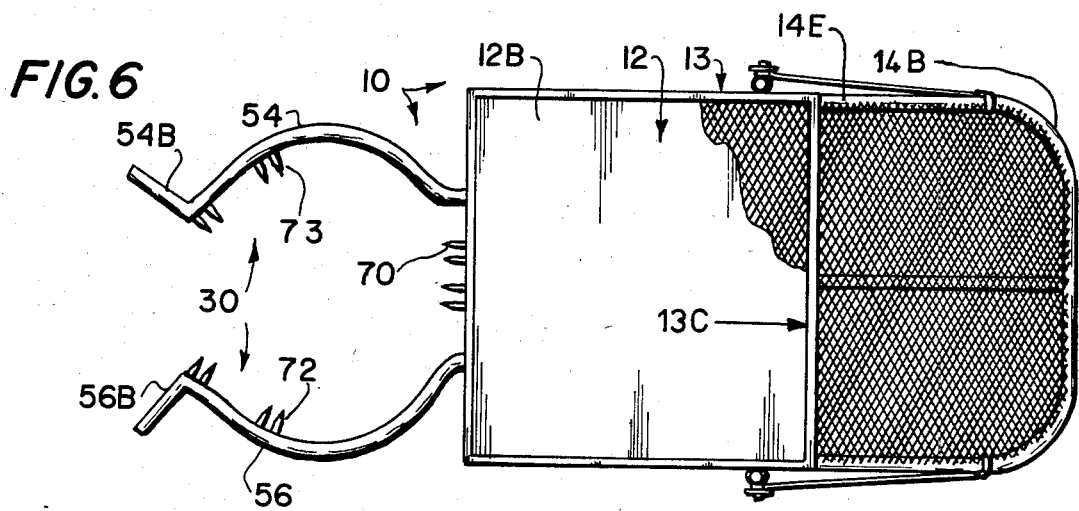
FIG. 6 is a fragmentary plan view of the tree stand deployed in a partially unfolded position; and, FIG. 7 is a side elevational view of the tree stand, with moved positions of key portions of the tree stand illustrated in dashed lines.

In operation the tree stand 10 is preferably transported in a "flat" position wherein the seat, foot rest, V-brace and stabilizer are folded to a convenient transportable position; of course the V-brace stabilizer must be disassociated from orifice 84. Preferably the rope 78 is appropriately tied about the apparatus so as to provide a convenient carrying handle or shoulder rest. Preferably the rope will be appropriately tied so as to secure the various "loose" parts, such as ladder elements 41, 42, and 43 in a convenient "bundle" for carrying. After the hunter selects an appropriate tree he merely unties the rope and unfolds the stand parts through the intermediate positions illustrated in dashed lines illustrated in FIGS. 4 and 6.

After the tree stand is substantially unfolded, the intermediate ladder system 40 may be coupled together by assembly the individual elements 41–43. Cables 23A and 23B are deployed as previously described to maintain the seat and yoke in operative alignment; cables 17A and 17B will automatically unfold to maintain the foot rest in proper orientation relative to the seat. The stabilizer 81 may then be properly coupled to the yoke, as previously discussed. Then the assembled ladder assembly may be coupled to yoke member 91 and the entire apparatus may be lifted up towards a suitable vertical position and urged directly into contact with the tree 34T. The open jaw members will clear the tree, and the seat spikes 70 will penetrate the tree trunk. At the option of the hunter, the stabilizer connection may be made immediately after lifting of the stand into tree engagement.

After the jaw members 54, 56 substantially circumferentially surround the tree, rope 78 may be forcibly drawn about locking arm members 54B, 56B so as to tightly compress the jaw members together, forcing at least a plurality of the jaw spike elements 72, 73 into binding engagement with the tree. Afterwards the ladder system base may be maneuvered into secure, at least partial penetration of the ground, and appropriate set-up adjustments to the V-brace (i.e. by manual movements of the brace and manual rotation of stabilizer wing element 85) will properly tension the brace and the deployed assembly, and proper penetration of the tree by V-brace spike 79 will be assured. Besides maintaining the jaw members in an operative "closed" or deployed position, the rope will further brace the entire stand if it is appropriately tied about the ladder assembly and the tree.

To remove the stand the rope 78 is first untied it may be subsequently pulled to "pop" one of the jaw elements from engagement with the tree. The thus loosened jaw assembly 30 facilitates subsequent rocking of the stand (i.e. via the ladder assembly), and thereafter stand 10 may be removed from the tree. Once on the ground stabilizer 81 is disassociated from the yoke, and the seat cables are disconnected. The entire apparatus is then folded together, and the rope may be appropriately wound around the apparatus and securely tied. It will be appreciated that a hunt may only be temporarily abandoned, and in such a case the hunter may simply climb down the ladder 40, and lift the ladder base 43B out of the ground. He may then detach the ladder from the yoke (i.e. crimped end 41A will withdraw from yoke member 91), and the ladder parts may be easily carried back to camp. The stand will thus remain temporarily in an elevated, relatively inaccessible position.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A portable tree stand for use by hunters, outdoorsmen or the like for positioning themselves at an elevated position upon a tree, said tree stand comprising:
   a rigid, generally planar seat for supporting said hunter, outdoorsman or the like above ground, said seat having a rigid frame, a pair of opposite sides, and a front and a rear;
   a generally U-shaped, rigid support yoke having a pair of spaced-apart, generally parallel ends pivotally coupled to said planar seat upon opposite sides thereof;
   a rigid, generally planar, cooperating foot rest pivotally secured to said U-shaped yoke adapted to be selectively deployed in an operational position generally parallel with and beneath said seat portion;
   jaw means for securing said stand to a tree, said jaw means comprising first and second cooperating jaw members pivotally secured to said seat frame and adapted to be selectively deployed in substantially circumferential engagement with a tree, said jaw members occupying a plane substantially parallel with said planar seat, each of said jaw members provided with a plurality of tree engaging spikes for engaging the tree, said jaw members extending outwardly from said seat away from the rear thereof;

a rigid, tree-engaging V-brace pivotally secured to said seat frame generally at the front of said seat, said brace extending downwardly and converging in a pointed portion adapted to forcibly penetrate said tree beneath and to the rear of said seat; and, elongated ladder means for supporting said tree stand, said ladder means, when deployed, extending between ground and said tree stand and facilitating the installation and removal of said stand and the ingress and egress of said hunter, outdoorsman or the like relative to said stand.

2. The tree stand as defined in claim 1 including spring means for normally biasing said jaw members to a maximally open, tree engageable position whereby the jaws will circumferentially surround the tree when said stand is first moved into contact with said tree.

3. The tree stand as defined in claim 2 wherein said jaw members terminate in outwardly diverging locking arm portions adapted to be drawn together by the hunter with a rope or the like against yieldable pressure from said spring means whereby to compress the jaw members about the tree and urge at least a portion of said jaw member spikes into penetrating engagement with said tree, whereby to affix said tree stand to said tree.

4. The tree stand as defined in claim 3 including stabilizer means extending, when said tree stand is deployed, generally horizontally between said V-brace and a portion of said tree stand whereby to reinforce said stand.

5. The tree stand as defined in claim 4 wherein said seat is provided with a plurality of rigid spikes extending rearwardly from its frame and adapted to penetrate said tree during installation of said stand to further brace same.

6. The tree stand as defined in claim 5 wherein said ladder means comprises a plurality of separate members which are adapted to be coupled in axial alignment, one with another, to adapt said tree stand for deployment at a user selectable height above ground.

7. The tree stand as defined in claim 3 including a first pair of cables adapted to be coupled between said seat frame and said yoke and a second pair of cables extending between said seat and said foot rest for bracing said seat, foot rest and yoke in proper operational relation when said tree stand is properly deployed.

8. The tree stand as defined in claim 7 wherein said seat is provided with a plurality of rigid spikes extending rearwardly from its frame and adapted to penetrate said tree during installation of said stand to further brace same.

9. The tree stand as defined in claim 8 wherein said ladder means comprises a plurality of separate members which are adapted to be coupled in axial alignment, one with another, to adapt said tree stand for deployment at a user selectable height above ground.

10. A portable hunter's tree stand adapted to be transported in a substantially flat folded position and then unfolded for subsequent deployment upon a selected tree, the tree stand comprising:

a flat seat for securely supporting the hunter above ground, said seat having a rigid frame, sides, a front and a rear, and a plurality of rigid, rearwardly extending spikes associated with said frame for penetrating said tree when said tree stand is deployed;

a generally U-shaped, rigid, yoke having a pair of spaced-apart, generally parallel ends pivotally coupled to said seat upon opposite sides thereof;

a rigid, flat, cooperating foot-rest pivotally associated with said U-shaped yoke and adapted to be operationally disposed in a position generally parallel to and spaced-apart from said seat;

jaw means associated with said seat for circumferentially engaging the tree whereby to secure said stand to said tree, said jaw means comprising first and second jaw members pivotally associated with said seat frame and extending rearwardly therefrom, each of said jaw members including a plurality of rigid spikes adapted to penetrate said tree when said tree stand is installed;

a rigid generally V-shaped brace pivotally secured to said seat frame and converging downwardly in a pointed spike portion adapted to forcibly penetrate said tree;

stabilizer means extending from said V-shaped brace and adapted to be coupled, when said stand is properly operationally deployed, to said yoke whereby to reinforce said stand; and, ladder means for facilitating access to and withdrawal of said hunter with respect to said seat.

11. The tree stand as defined in claim 10 wherein:
said jaw members are normally biased to a maximally open, tree engageable position; and,
said jaw members terminate in outwardly diverging locking arm portions adapted to be drawn together with a rope or the like to compress said jaw members into binding engagement with the tree during erection of said tree stand.

12. The tree stand as defined in claim 11 wherein said ladder means comprises a plurality of separate members which are adapted to be coupled in axial alignment, one with another, to adapt said tree stand for deployment at a user selectable height above said ground, the lowermost one of said separate members having a lower spike portion adapted to be forced into the ground to provide support.

13. The tree stand as defined in claim 12 including user adjustable means axially associated with said V-brace stabilizer means for varying the operational length of said stabilizer means whereby to insure penetration of said V-brace pointed spike portion within said tree.

14. The tree stand as defined in claim 13 including a first pair of flexible cables for bracing said seat frame relative to said yoke and a second pair of flexible cables for bracing said foot rest relative to said seat.

15. The tree stand as defined in claim 14 wherein said ladder means includes a plurality of separate members adapted to be axially couple together, one with another, the lowermost of the ladder members including a foot for contacting the ground, and the uppermost ladder member adapted to be releasibly coupled to said yoke.

16. The tree stand as defined in claim 15 including an elongated rope coupled to one of said jaw members locking arm portions, and adapted to be looped around the other of said jaw member locking arm portions whereby to facilitate the compression of said jaw members during erection of said tree stand.

* * * * *